(12) United States Patent
Davison

(10) Patent No.: US 7,293,252 B2
(45) Date of Patent: Nov. 6, 2007

(54) CASE MODELLING

(75) Inventor: Gerard Davison, Reading (GB)

(73) Assignee: Oracle International Corporation, Redwood Shores, CA (US)

( * ) Notice: Subject to any disclaimer, the term of this patent is extended or adjusted under 35 U.S.C. 154(b) by 562 days.

(21) Appl. No.: 10/673,330

(22) Filed: Sep. 30, 2003

(65) Prior Publication Data

US 2005/0080785 A1 Apr. 14, 2005

(51) Int. Cl.
*G06F 9/45* (2006.01)
(52) U.S. Cl. ...................................... 717/104
(58) Field of Classification Search ................. 717/104
See application file for complete search history.

(56) References Cited

U.S. PATENT DOCUMENTS

| | | | |
|---|---|---|---|
| 6,385,763 B1 * | 5/2002 | Meyer et al. ................ | 717/100 |
| 6,745,208 B2 * | 6/2004 | Berg et al. .................. | 707/201 |
| 6,874,146 B1 * | 3/2005 | Iyengar ....................... | 719/313 |
| 6,887,111 B2 * | 5/2005 | Nakai et al. ................. | 439/669 |
| 7,047,518 B2 * | 5/2006 | Little et al. .................. | 717/108 |
| 2002/0108101 A1 * | 8/2002 | Charisius et al. ........... | 717/105 |
| 2003/0212778 A1 * | 11/2003 | Collomb ...................... | 709/223 |

OTHER PUBLICATIONS

Biddle et al., Essential Use Cases . . . , 2001, ACM, p. 7-16.*
Suzuki et al. Managing the software design . . . , ACM, p. 127-136.*

* cited by examiner

*Primary Examiner*—John Chavis
(74) *Attorney, Agent, or Firm*—Bingham McCutchen LLP

(57) ABSTRACT

A computer implemented method for creating a use case description corresponding to a use case diagram for a process is described. The use case diagram comprises a plurality of entities wherein each entity belongs to one of a plurality of categories and is one of at least one pair of entities linked by a relationship. The method comprises retrieving a template for each entity, from a database of mark-up language templates, the database having a template for each category of entity; adapting each retrieved template such that it has a unique identifier and such that the retrieved template for at least one of each pair of related entities comprises data defining their relationship; and, storing the adapted template in a store, the stored adapted templates representing the use case description.

Methods for automatically generating a use case diagram from a use case description and for synchronising a use case diagram and description automatically are described.

16 Claims, 5 Drawing Sheets

CASE MODELLING

This invention relates to the automatic synchronisation of a use case diagram with a use case description.

Use case modelling is an important technique included within the unified modelling language (UML). It is used to describe and define the requirements regarding how a user interacts with a computer system in order to perform a process. A use case model comprises a use case diagram and a use case description.

The use case diagram identifies the functionality provided by the process and the users who interact with the process and the association between the users, known as actors, and the functional entities, known as use cases, of the process. Associated with the use case diagram, the use case description describes the series of actions required to achieve the functionality. Typically, the use case description may comprise a paragraph describing the sequence of activities in each use case or, it may comprise a template, such as that described "Writing Effective Use Cases" by Alistair Cockburn published by Addison Wesley in 2000, for each use case.

However, a problem exists since it is necessary to generate the use case diagram and use case description separately. Thus, any amendments made to either the use case diagram and use case description must be reflected in the other. Many users of the technique find this irritating and hence, often abandon the use case diagram in favour of the use case description only since the use case diagram represents a subset of the content of the use case description. This is particularly disadvantageous since the use case diagram can convey the relationships between the use cases more readily.

In accordance with one aspect of the present invention, there is provided a computer implemented method for creating a use case description corresponding to a use case diagram for a process, the use case diagram comprising a plurality of entities wherein each entity belongs to one of a plurality of categories and is one of at least one pair of entities linked by a relationship, the method comprising:
 a. retrieving a template for each entity, from a database of mark-up language templates, the database having a template for each category of entity;
 b. adapting each retrieved template such that it has a unique identifier and such that the retrieved template for at least one of each pair of related entities comprises data defining their relationship; and,
 c. storing the adapted template in a store, the stored adapted templates representing the use case description.

In accordance with a second aspect of the present invention, there is provided a computer implemented method for creating a use case diagram corresponding to a use case description for a process, the use case description comprising a plurality of mark-up language definitions, wherein each mark-up language definition belongs to one of a plurality of categories and is one of a pair of mark-up language definitions linked by a hyperlink, each hyperlink defining a relationship between each pair of mark-up language definitions, the method comprising:
 a. displaying an icon for each mark-up language definition, the icon depicting the category of the mark-up language definition;
 b. extracting one or more hyperlinks from each mark-up language definition; and,
 c. displaying a representation of the relationship for each hyperlink extracted.

Typically, each relationship is one of a communication, extension, inclusion or generalization relationship.

Normally, each entity is either a use case or an actor; and, in this case each icon depicts either a use case or an actor.

In a preferred embodiment, the mark-up language templates are XHTML templates.

Preferably, each entity has a name and each retrieved template is further adapted such that it bears the name of the associated entity.

Normally, each mark-up language definition has a back reference to each other mark-up language definition that is linked to it by a hyperlink.

In accordance with a third aspect of the present invention, there is provided a computer implemented method for synchronising a use case diagram and a use case description, the method comprising detecting a change made to either the use case description or the use case diagram and reflecting that change in the other of the use case description or use case diagram.

In a preferred embodiment, the use case description comprises a plurality of mark-up language definitions, each belonging to one of a plurality of categories and being one of a pair of mark-up language definitions linked by a hyperlink, each hyperlink defining a relationship between each pair of mark-up language definitions, and wherein each mark-up language definition has a back reference to each other mark-up language definition that is linked to it by a hyperlink.

Many varieties of amendment are possible. Examples include the addition of an entity to a use case diagram; deletion of an entity from a use case diagram; and, renaming of an entity on a use case diagram.

Similarly, amendments such as these may be made to the mark-up language definitions of the use case description and these changes may then be reflected into the use case diagram.

Preferably, prior to detecting the change made to either the use case description or the use case diagram, the use case diagram is compared to the use case description, and if they differ, the use case diagram is amended to conform with the use case description.

An embodiment of the invention will now be described with reference to the accompanying drawings in which.

Figure 1:
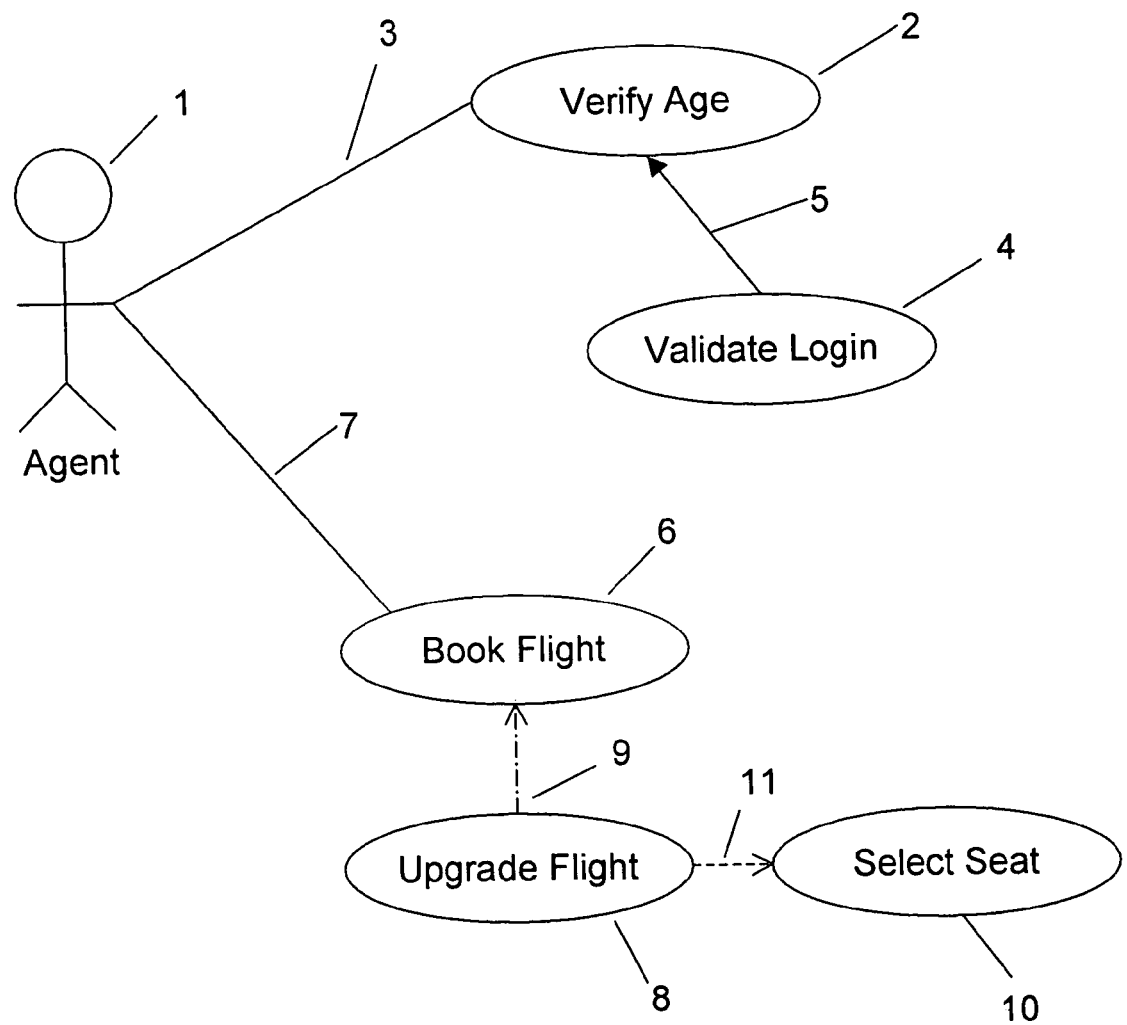
FIG. 1 shows an example use case diagram.

The use case shown in FIG. 1 relates to a process for booking tickets for a flight using a computer. The diagram shows an actor 1, known as "Agent", which is related to a use case 2 known as "Verify Age" and to a use case 6, known as "Book Flight" by communication relationships 3 and 7 respectively, which are depicted as solid lines. The use case 2 is related to a use case 4, known as "Validate Login", by a generalization relationship 5. The generalization relationship 5 is depicted as a solid line with a closed arrowhead pointing towards the generalised element. The use case 6 is related to a use case 8, known as "Upgrade Flight", by an extension relationship 9 and use case 8 is further related to a use case 10, known as "Select Seat" by an inclusion relationship 11. The extension relationship 9 is depicted as a dashed and dotted line with an open arrowhead pointing towards the use case that is being extended and the inclusion relationship 11 is depicted as a dashed line with an open arrowhead pointing towards the included use case.

This use case diagram is merely used as an illustrative example. It is not important to understand the functionality of the use cases or their interaction in order to understand the invention although a skilled man will fully understand this type of use case diagram and the relationships used to construct it.

Figure 2:
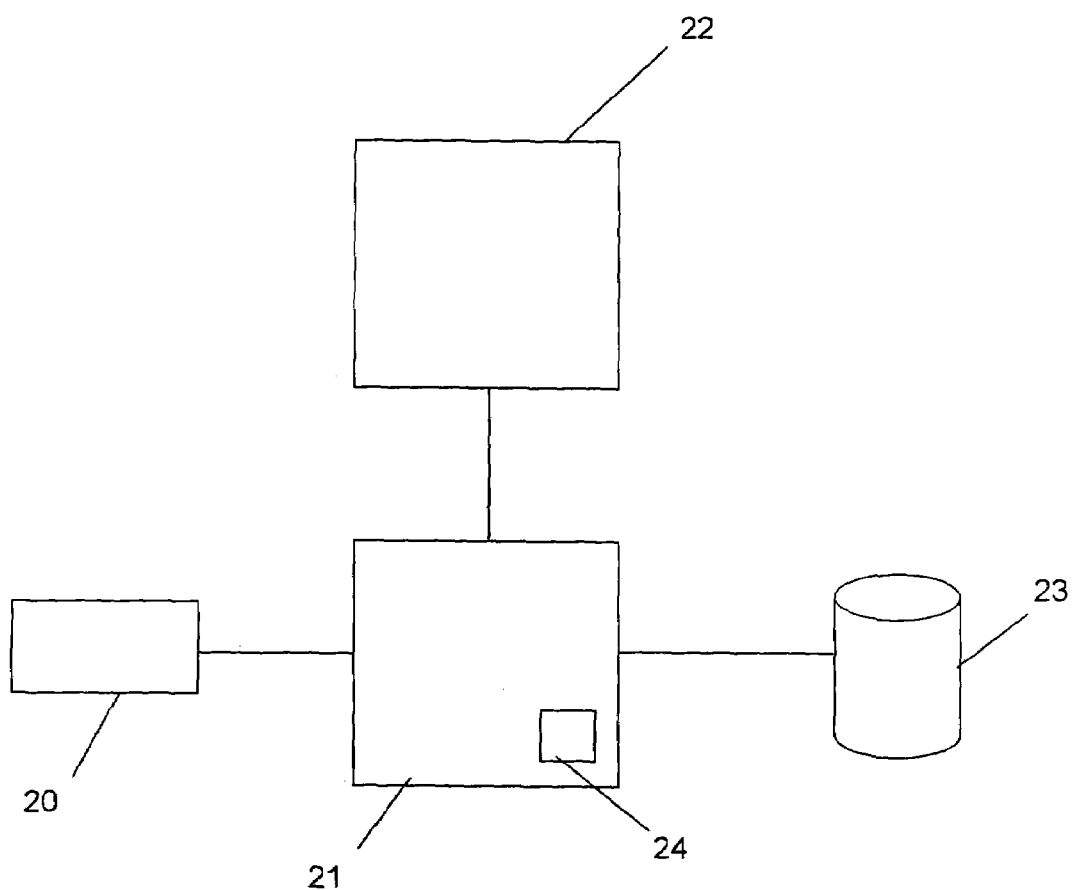
FIG. 2 shows suitable computer apparatus for performing the invention.

FIG. 2 shows an input device 20, for example a mouse or keyboard, connected to a computer 21 that is running software suitable for performing the invention. The computer is connected to a visual display unit 22 for displaying the use case diagram and/or the use case description. It is also connected to a database 23 in which templates for use in producing a use case description are stored, as will become evident later. The computer 21 also has an internal store 24 for storing the use case description and the use case diagram.

There are two methods by which the use case diagram and the corresponding use case description may be created. The use case description comprises an extensible hypertext mark-up language (XHTML) file for each entity of the diagram. That is to say that each of the use case icons 2, 4, 6, 8 and 10 and the actor icon 1 has a corresponding XHTML file which represents it in the use case description. The relationships between the entities of the use case diagram are represented by hyperlinks between the XHTML files as will become evident later.

The first method for creating the use case is to use a graphical entry tool to draw the use case diagram and then automatically create the use case description from that. The second method involves creating the XHTML definitions for each entity and then creating the use case diagram from those XHTML definitions.

In the first method, each entity is drawn by a user with a graphical entry tool running on computer 21 in which the icons representing the entity are selected by a user from a palette of such icons and then placing the icon at the desired position on the computer screen. For example, the actor 1 is chosen from the palette and then the icon is placed at the desired position. The use case icons 2, 4, 6, 8 and 10 are similarly selected from the palette and placed on the diagram. Such techniques are well known for the generation of drawings using a computer and, it will be evident that selection and placement of the icons may be achieved using a variety of input devices, for example using a mouse or a keyboard.

Once the icons for the use cases 2, 4, 6, 8 and 10 and the actor 1 have been placed, the relationships 3, 5, 7, 9 and 11 between them are added to the diagram in the same way using the icon palette. It will be clear to those skilled in the art that the order of placement of the icons and relationships is not important and that the relationship between each pair of icons may be added as soon as that pair of icons has been placed on the drawing.

The use case description is then generated from this diagram. This may be done either concurrently with the graphical entry of the components of the diagram or alternatively, it may be created after the diagram is fully drawn. For each icon 1, 2, 4, 6, 8, 10 placed on the use case diagram, a template according to the category of the icon is retrieved by computer 21 from the database 23 of templates. That is to say, that for the use case icons 2, 4, 6, 8 and 10 a template for a use case is retrieved from the database 23 and for the actor 1, a template for an actor is retrieved from the database 23. The templates are XHTML files that contain no data specific to the actual use case or actor.

Each template retrieved from the database 23 of templates is then adapted to form an XHTML definition of the use case or actor such that it has a globally unique identifier, which is a unique number selected by the software running on computer 21 for adapting the template such that each adapted template can be uniquely identified. The template is also adapted to bear the name of the use case or actor.

A hyperlink to each other XHTML definition referred to by the template being adapted is inserted to define the necessary relationships. Furthermore, a back reference is inserted in each of the XHTML definitions referred to by the template being adapted.

For example, considering the actor 1, a hyperlink is inserted in the XHTML template retrieved from the database 23 for actor 1 that points to the XHTML definition for the use case 2, thereby representing the communication relationship 3. Similarly, a hyperlink is inserted in the XHTML template for actor 1 pointing to the use case 6 to represent the communication relationship 7. Back references to the XHTML template for actor 1 are inserted into the XHTML definitions for use cases 2 and 6 to indicate that they are referred to by actor 1.

The hyperlinks for the communication relationships 3 and 7 are inserted in a section known as the "Stakeholder" section of the XHTML definition for actor 1, the hyperlink representing the generalization relationship 5 is inserted in the "Specialists" section of the XHTML definition representing use case 4, the extension relationship 9 is inserted in the "Extends" section of the XHTML definition representing use case 8 and the inclusion relationship 11 is inserted in the "Scenario" section of the XHTML definition for use case 8. By placing the hyperlinks representing the different relationships in different sections of the XMTML definition, the type of relationship is defined and can be determined automatically by a computer, for example for creating a use case diagram from the XHTML definitions.

When the XHTML definitions representing the use case description have been suitably adapted from the templates, they are stored in the internal memory 24 of computer 21 for future use. Clearly, they could alternatively or in addition, be stored on a hard disk drive or other type of store used with computers.

Figure 3:
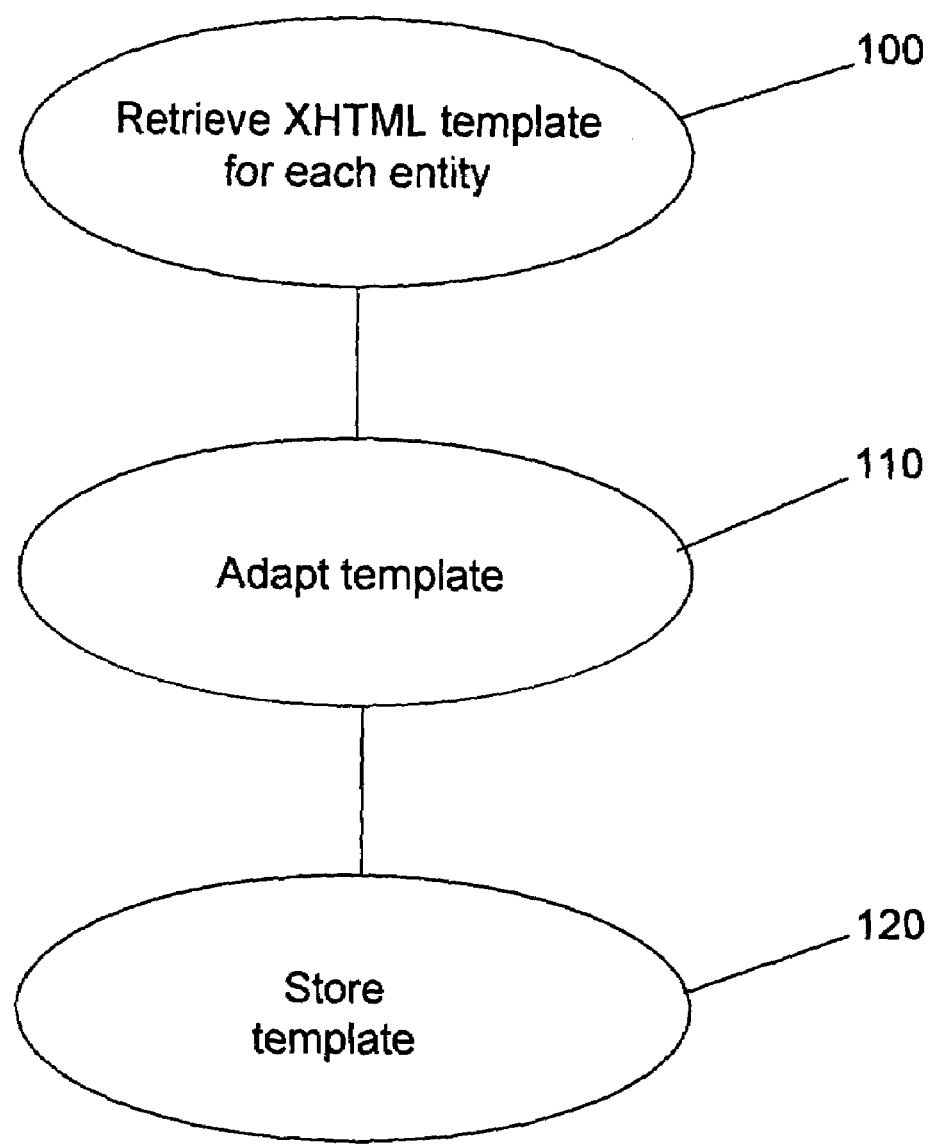
FIGS. 3 to 5 shows flow diagrams for performing methods according to the invention.

FIG. 3 shows a flow diagram for this method, in which in step 100 an XHTML template is retrieved for each entity, that is each use case and each actor, of the use case diagram. Each retrieved template is then adapted in step 110 such that it has a globally unique identifier and such that the retrieved templates for each pair of related entities contains data defining their relationship, that is the hyperlink and back reference as previously mentioned. As such, the adapted templates contain the data necessary to define each of the relationships, whether it be a communication, extension, inclusion or generalization relationship. In step 110, each retrieved template will be further adapted such that it bears the name of the associated entity and then, in step 120, the adapted templates for each entity are stored in the internal memory 24 of computer 21.

In the second method, the use case description is generated manually first and then the use case diagram is automatically created from it. Again, the use case description comprises an array of XHTML files, one for each entity (e.g. use case or actor) that will appear on the use case diagram. This is done in the same way as with the first method, albeit that the templates retrieved from the database are adapted manually by a user in order to define the structure shown in FIG. 1 by including hyperlinks and back references as necessary. However, the globally unique identifier is still automatically attributed to each XHTML definition when the template is retrieved from the database.

These XHTML definitions are then stored as before in the internal memory 24 of the computer 21. Alternatively or in addition, they may be stored on a hard disk or similar storage device. From this stored set of XHTML definitions, the use case diagram shown in FIG. 1 can be automatically generated by drawing an icon representing the category of each template that has been adapted and displaying the name for that template adjacent to the icon. The hyperlinks are then retrieved from each XHTML definition and a representation of the relationship is displayed for each hyperlink extracted.

In the present case, the communication relationship is represented by a solid line joining the two icons on the use case diagram, a generalization relationship is shown as a solid line with a solid arrowhead pointing towards the generalized element, an extension relationship is shown as a dashed and dotted line with an open arrowhead pointing towards the use case that is being extended, and the inclusion relationship is represented by a dashed line with an open arrowhead pointing towards the included use case. As such, the use case diagram shown in FIG. 1 is generated entirely automatically from the use case description.

Figure 4:
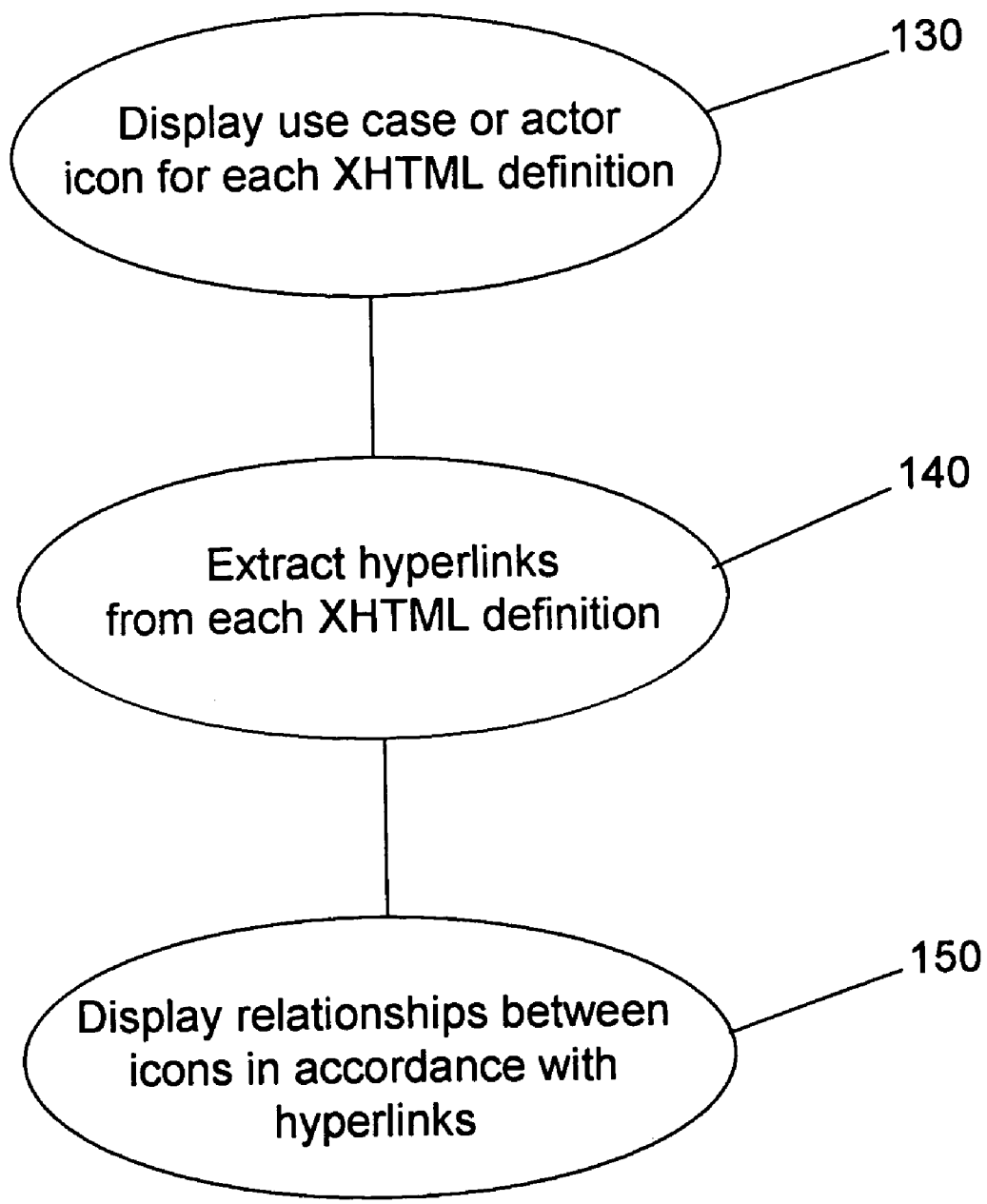

FIG. 4 shows a flow diagram for the method of generating a use case diagram from a use case description. In step 130, the use case or actor icon as appropriate is displayed for each XHTML definition. The hyperlinks for each of the communication, extension, inclusion and generalization relationships are then extracted from each XHTML definition in step 140 and the relationships are displayed, in step 150 between the icons in accordance with the extracted hyperlinks.

A corollary of these two methods is that any amendment made to a use case diagram can be automatically reflected into the corresponding use case description and vice versa.

Clearly, myriad different types of amendment are possible but the techniques used in each case are similar and so by describing some examples, the techniques used for other types of amendment will become apparent. Four examples are the addition or deletion of a use case or actor, the renaming of a use case or actor and the changing of a relationship from one variety to another.

With respect to the addition of an object it will be clear from the description of the previous two methods how this is achieved and how the use case diagram is synchronised with the use case description or vice versa.

With respect to deletion, this is best described with reference to an example. If use case icon 2 is deleted from the use case diagram then the corresponding XHTML definition held in the store can be deleted and, at the same time, that XHTML definition is scanned to find all back references to other use cases or actors referring to use case 2 and the hyperlinks referring to use case 2 in those other use cases or actors are then deleted. Furthermore, all back references in other use cases or actors referred to by hyperlinks in the XHTML definition for use case 2 are similarly removed.

Alternatively, the XHTML definition corresponding to use case 2 may be deleted and the process proceeds in a similar manner with the relevant back references and hyperlinks being removed. However, in this case, the corresponding use case icon 2 is deleted from the drawing as a result of the XHTML definition being deleted. The related relationships 3 and 5 are correspondingly deleted.

The deletion of use case 2 from the use case description and diagram results in use case 4 being unrelated to any other use case or actor and this may be flagged as an error by the computer or alternatively, ignored.

With respect to renaming a use case or actor, if this is done in a use case diagram then that change is reflected in the corresponding XHTML definition to the use case or actor for which the name has been changed. Furthermore, the hyperlinks present in XHTML definitions which have a back reference in the XHTML definition for which the name has been changed are similarly changed to reflect the new name. Alternatively, if the name is changed in the use case description then the back references are used in a similar manner to before to reflect the change in the hyperlinks of other XHTML definitions but the change of name is reflected in the drawing.

The fourth example is the change of category of a relationship. For example, it may be required to change the relationship 9 from an extension relationship to an inclusion relationship. If this is done in the use case diagram then the hyperlink in the XHTML definition for use case 8 relating to the extension relationship 9 is deleted and a new hyperlink is inserted in the XHTML definition for use case 6 for the inclusion relationship. The necessary changes are also made to the back references. Obviously, if the change is made to the use case description then the drawing can be changed by detecting this change and redisplaying the extension relationship 9 as an inclusion relationship.

It will be clear to the skilled man that amendments made either to the use case diagram or to the use case description can be reflected in the other by referring to the relevant hyperlinks and back references in the XHTML definition related to the use cases and actors of a use case diagram. Thus, it is possible to refer changes made to a use case diagram into the use case description and vice versa.

Figure 5:
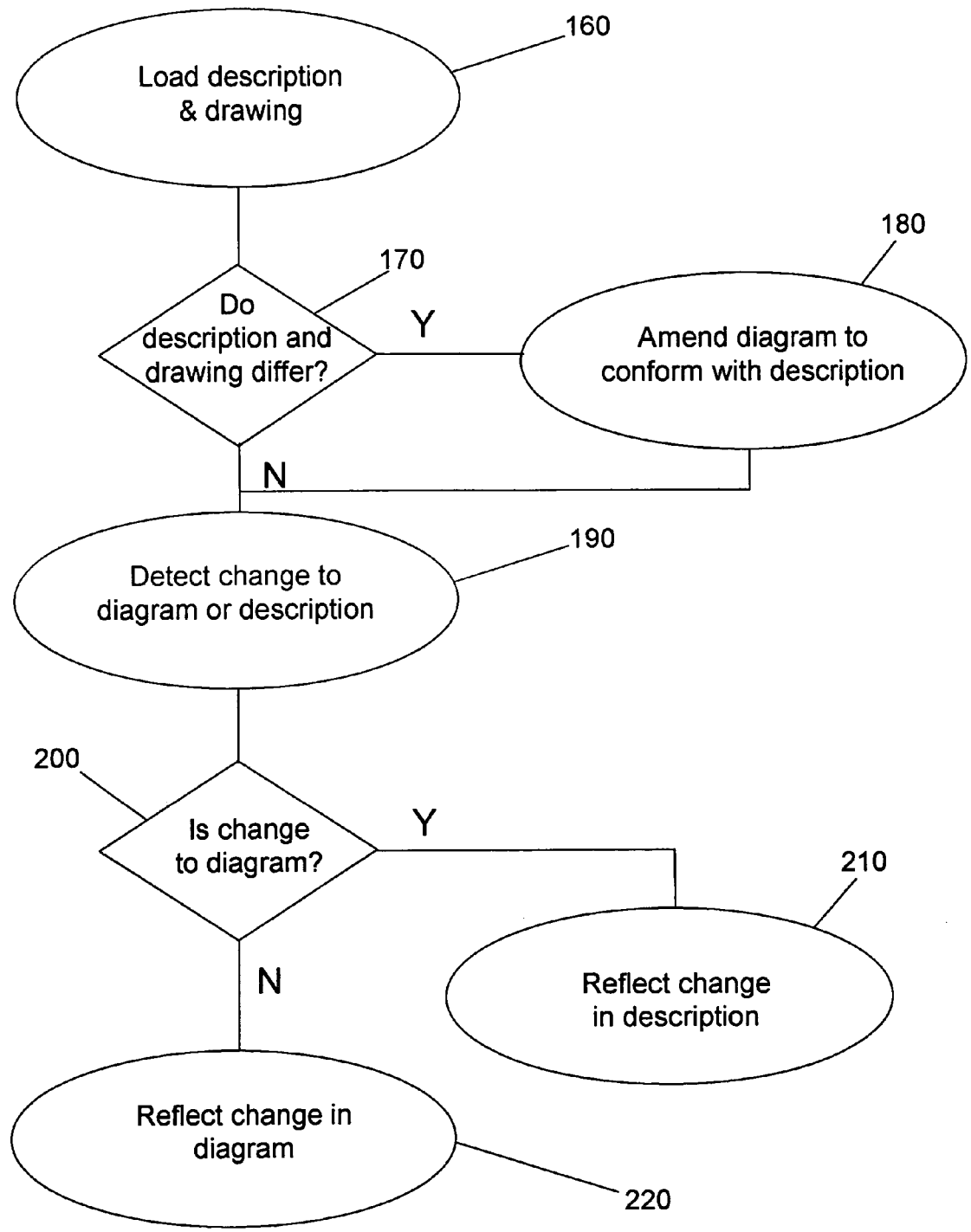

A flow diagram is shown in FIG. 5 for automatically synchronising the use case diagram and the use case description. The first step 160 loads the XHTML definitions, representing the use case description, and the use case diagram into memory 24. In decision step 170 any discrepancy between the use case diagram and description is detected. If there is none, then processing proceeds to step 190. However, if there is a discrepancy, then the use case description is assumed to be correct and the use case diagram is amended to conform with it in step 180, before step 190 is performed. In step 190, changes are detected that have been made to either the use case description or the use case diagram. In decision step 200 it is determined whether the change is to the diagram. If it is, then step 210 is performed, in which the detected change is reflected in the description. However, if in step 200 it is determined that the change is not to the diagram but instead, to the description, then in step 220 the change to the description is reflected in the use case diagram.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disk drive, RAM and CD-ROMs as well as transmission-type media such as digital and analogue communications links.

I claim:

1. A computer implemented method for creating a use case description corresponding to a graphical use case diagram for a process, the use case diagram comprising a plurality of graphical entities wherein each graphical entity belongs to one of a plurality of categories and is one of at least one pair of graphical entities linked by a graphical relationship, the method comprising:

a. retrieving a template for each graphical entity, from a database of mark-up language templates, the database having a template for each category of graphical entity;

b. adapting each retrieved template such that it has a unique identifier and such that the retrieved template for at least one of each pair of related graphical entities comprises data defining their graphical relationship; and, c. storing the adapted template in a store, the stored adapted templates representing the graphical use case description.

2. A method according to claim 1, wherein each graphical relationship is one of a communication, extension, inclusion or generalization relationship.

3. A method according to claim 1, wherein each graphical entity is either a use case or an actor.

4. A method according to claim 1, wherein the mark-up language templates are XHTML templates.

5. A method according to claim 1, wherein each graphical entity has a name and each retrieved template is further adapted such that it bears the name of the associated graphical entity.

6. A computer implemented method for creating a graphical use case diagram corresponding to a use case description for a process, the use case description comprising a plurality of mark-up language definitions, wherein each mark-up language definition belongs to one of a plurality of categories and is one of a pair of mark-up language definitions linked by a hyperlink, each hyperlink defining a relationship between each pair of mark-up language definitions, the method comprising:

a. displaying an icon for each mark-up language definition, the icon depicting the category of the mark-up language definition;

b. extracting one or more hyperlinks from each mark-up language definition; and, c. displaying a graphical representation of the relationship for each hyperlink extracted.

7. A method according to claim 6, wherein each relationship is one of a communication, extension, inclusion or generalization relationship.

8. A method according to claim 6, wherein each icon depicts either a use case or an actor.

9. A method according to claim 6, wherein the mark-up language is XHTML.

10. A method according to claim 6, wherein each mark-up language definition has a back reference to each other mark-up language definition that is linked to it by a hyperlink.

11. A computer implemented method for synchronising a graphical use case diagram and a use case description, the method comprising detecting a change made to either the use case description or the graphical use case diagram and reflecting that change in the other of the use case description or graphical use case diagram.

12. A method according to claim 11, wherein the use case description comprises a plurality of mark-up language definitions, each belonging to one of a plurality of categories and being one of a pair of mark-up language definitions linked by a hyperlink, each hyperlink defining a relationship between each pair of mark-up language definitions, and wherein each mark-up language definition has a back reference to each other mark-up language definition that is linked to it by a hyperlink.

13. A method according to claim 11, wherein the change is the addition of an entity to a graphical use case diagram.

14. A method according to claim 11, wherein the change is deletion of an entity from a graphical use case diagram.

15. A method according to claim 11, wherein the change is renaming of an entity on a graphical use case diagram.

16. A method according to claim 11, wherein prior to detecting the change made to either the use case description or the graphical use case diagram, the graphical use case diagram is compared to the use case description, and if they differ, the graphical use case diagram is amended to conform with the use case description.

* * * * *

UNITED STATES PATENT AND TRADEMARK OFFICE
CERTIFICATE OF CORRECTION

| | | |
|---|---|---|
| PATENT NO. | : 7,293,252 B2 | Page 1 of 1 |
| APPLICATION NO. | : 10/673330 | |
| DATED | : November 6, 2007 | |
| INVENTOR(S) | : Gerard Davison | |

It is certified that error appears in the above-identified patent and that said Letters Patent is hereby corrected as shown below:

Title Page, Item (54) and Col. 1, Line 1 Title of the Patent: "Case Modelling" should read --Improvements To Use Case Modelling--.

Signed and Sealed this

Tenth Day of June, 2008

JON W. DUDAS
*Director of the United States Patent and Trademark Office*